United States Patent [19]

Holtmyer et al.

[11] Patent Number: 4,959,163

[45] Date of Patent: Sep. 25, 1990

[54] POLYAMPHOLYTES-HIGH TEMPERATURE POLYMERS AND METHOD OF USE

[75] Inventors: Marlin D. Holtmyer; Charles V. Hunt, both of Duncan, Okla.

[73] Assignee: Halliburton Company, Duncan, Okla.

[21] Appl. No.: 267,489

[22] Filed: Nov. 3, 1988

[51] Int. Cl.$^5$ .............................................. E21B 43/26
[52] U.S. Cl. ............................. 252/8.551; 166/305.1; 166/308; 166/283
[58] Field of Search .................. 252/8.551; 166/305.1, 166/308, 283

[56] References Cited

U.S. PATENT DOCUMENTS

| | | |
|---|---|---|
| 2,087,506 | 8/1936 | DeGroote . |
| 2,692,285 | 10/1954 | Robinson . |
| 2,775,617 | 12/1956 | Shapiro . |
| 3,297,706 | 7/1967 | Sobolev . |
| 3,813,441 | 5/1974 | Mueller-Schiedamayer . |
| 3,826,311 | 7/1974 | Szabo et al. ............ 166/305.1 X |
| 3,868,328 | 2/1975 | Boothe et al. ............ 166/308 X |
| 3,943,060 | 3/1976 | Martin et al. ............ 166/308 X |
| 4,056,496 | 11/1977 | Mancini . |
| 4,147,681 | 4/1979 | Lim . |
| 4,152,274 | 5/1979 | Phillips et al. ............ 166/308 X |
| 4,209,651 | 6/1980 | Prichard . |
| 4,224,150 | 9/1980 | Buriks . |
| 4,319,013 | 3/1982 | Cabestany . |
| 4,435,528 | 3/1984 | Domina . |
| 4,460,758 | 7/1984 | Peiffer et al. ............ 526/287 |
| 4,462,917 | 7/1984 | Conway . |
| 4,464,270 | 8/1984 | Hollenbeak . |
| 4,470,915 | 9/1984 | Conway . |
| 4,477,360 | 10/1984 | Almond . |
| 4,502,967 | 3/1985 | Conway . |
| 4,520,210 | 5/1985 | Schneider . |
| 4,552,670 | 11/1985 | Lipowski . |
| 4,563,292 | 1/1986 | Borchardt ............ 166/305.1 X |
| 4,605,718 | 8/1986 | Jansma . |
| 4,610,305 | 9/1986 | Martin . |
| 4,627,926 | 12/1986 | Peiffer et al. ............ 166/308 X |
| 4,699,722 | 10/1987 | Dymond et al. ............ 252/8.551 |
| 4,730,081 | 3/1988 | Holtmyer . |
| 4,767,550 | 8/1988 | Hanlon . |

FOREIGN PATENT DOCUMENTS

| | | | |
|---|---|---|---|
| 926540 | 5/1973 | Canada ............................ 166/308 |
| 0115836 | 1/1984 | European Pat. Off. . |
| 60-212590 | 10/1985 | Japan ............................ 166/305.1 |

OTHER PUBLICATIONS

Conway, Journal of Petroleum Technology, Feb. 315–320 (1983).
Doe, et al., "Development and Evaluation of EOR Polymers Suitable for Hostile Environments: Copolymers of Vinylpyrrolidone and Acrylamide," SPE 14233 (1985).

Primary Examiner—Robert L. Stoll
Assistant Examiner—Gary L. Geist
Attorney, Agent, or Firm—Robert A. Kent

[57] ABSTRACT

A method and composition for stimulating high temperature subterranean formations. The composition comprises a novel crosslinkable polymer containing anionic and cationic functional groups (a polyampholyte). The polyampholyte comprises a mixture of at least one from each of the following groups:

Group I acrylamide, partially hydrolyzed acrylamide, N,N-dimethylacrylamide, N-substituted-(N'-dialkylaminoalkyl) acrylamides, aminoalkylacrylates, dialkylaminoalkylacrylates or mixtures thereof;

Group II 2-acrylamido-2-methylpropane sulfonic acid, sodium salt, vinylphosphonic acid, partially hydrolyzed acrylamide or mixtures thereof; and Group III methacrylamidopropyldimethyl-2,3-dihydroxypropylammonium sulfate having the formula

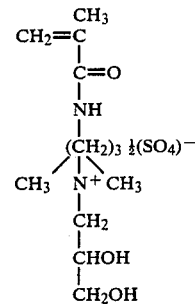

In the performance of the method, the polyampholyte is inverted into an aqueous liquid to form a viscous liquid which is buffered to about 4 to 6.5 and admixed with a crosslinking agent capable of crosslinking dihydroxypropyl functionalities. The crosslinked fluid then is introduced into a formation at a rate and pressure sufficient to fracture the formation.

16 Claims, No Drawings

POLYAMPHOLYTES-HIGH TEMPERATURE POLYMERS AND METHOD OF USE

BACKGROUND OF THE INVENTION

1. Field of the Invention

The present invention relates to the stimulating of subterranean formations surrounding oil wells, gas wells, water wells, injection wells and similar bore holes.

2. Brief Description of the Prior Art

The flow of oil from a subterranean formation to a well bore depends, among other factors, upon the permeability of the formation. Often permeability is not sufficient to allow a desired flow rate of fluids, such as crude oil or natural gas, from the formation. In such a case the formation can be treated to increase its permeability.

Hydraulic fracturing is one type of treatment used to increase the production of fluids. Accordingly many methods have been developed which are useful for hydraulically fracturing a subterranean formation penetrated by a well bore. Commonly, in the art of hydraulic fracturing, a fluid is introduced into the formation sought to be fractured by a conduit, such as tubing or casing, disposed in a well bore. The fluid is introduced at a rate and pressure sufficient to produce a fracture in the formation and to extend the produced fracture from the well bore into the formation. The fluid can include a propping agent, for example sand, which results in placement of the propping agent within the fracture thus produced. Following the fracturing treatment, the introduced fluid is recovered from the formation but the proppant remains in the produced fracture to prevent complete closure of the formation. Thus, a highly conductive channel extending from the well bore into the formation is created through which formation fluids can easily flow.

Conventional fracturing fluids containing water soluble polymers, such as high molecular weight polysaccharides, are well known in the art. Polysaccharides (e.g. galactomannan derivatives and cellulose derivatives) are readily solubilized in aqueous liquids (used herein to mean any fluid containing some water) and some polysaccharides can develop enhanced viscosity in the presence of mono- and other poly-valent cations. These polymer solutions are typically crosslinked with various metal ions, such as titanium or zirconium, to form viscoelastic gels. The term "gel" is used hereafter to mean any crosslinked polymer solution. Fracturing fluids based on polysaccharide-metal ion chemistry are limited in application because the polysaccharide backbone undergoes hydrolysis and oxidation at elevated temperatures. As a result, the viscosity and gel structure are rapidly lost when the fluid is exposed to high formation temperatures, used hereafter to mean temperatures in the range of 350° F. and above.

Many low permeability formations that require hydraulic fracturing to increase oil or gas production have temperatures in excess of 350° F. In order to effectively fracture this type of formation, the fracturing fluid must be temperature-stable, i.e., maintain viscosity and gel structure for a sufficient amount of time at formation temperature so that the fracture extends and the propping agent is placed at the desired distance from the well bore.

Synthetic polymers that can produce and maintain viscosity at temperatures above 350° F. have been developed for well stimulation, for example fracture acidizing. However, other deficiencies have prevented synthetic polymers from being used to any great extent for fracturing high temperature formations. Non-ionic synthetic polymers, such as polyacrylamide, have limited crosslinkability and therefore cannot attain sufficient viscosity and structure for fracturing and/or transporting proppant. Additional crosslink sites, for example carboxylate groups, may be incorporated into the polymer, but carboxylate groups induce salt sensitivity of the polymer. A polymer for hydraulic fracturing must be salt tolerant because the aqueous media is normally a brine which is needed to reduce or prevent swelling of the formation clays.

The present invention overcomes the above described deficiencies of polysaccharides and synthetic polymers used in conventional water-based fracturing fluids. The present invention provides a method for effectively stimulating high temperature subterranean formations utilizing a novel crosslinkable polyampholyte.

SUMMARY OF THE INVENTION

A novel composition has been discovered that provides a fracturing fluid for stimulating high temperature subterranean formations. This novel composition includes a polyampholyte, a polymer containing both cationic and anionic functional groups, that forms a viscous solution upon inversion in aqueous liquids. The polyampholyte solution is buffered to the appropriate pH and admixed with a crosslinking agent to subsequently form a highly viscoelastic, temperature-stable gel. The gel is then injected into a high temperature subterranean formation through a wellbore penetrating the formation at a sufficient rate and pressure to create a fracture in the formation.

DETAILED DESCRIPTION

Polyampholyte Composition

The present invention provides a new method for fracturing subterranean formations utilizing a novel polymer containing both cationic and anionic groups, hereafter referred to as a polyampholyte. The oppositely charged sites of the cationic and anionic groups are believed to allow inter- and intra-molecular interactions which provide many desirable properties for hydraulic fracturing fluids, in particular, salt tolerance in aqueous liquids, shielding of crosslink sites, and enhanced temperature stability.

The class of polyampholytes of the present invention are synthethized using known inverse emulsion techniques from a mixture of monomers which provide the anionic and cationic functionalities. The monomers from which the polyampholytes can be produced include, but are not limited to, acrylamide (AM), partially hydrolyzed acrylamide, N,N-dimethylacrylamide, 2-acrylamido-2-methylpropane sulfonic acid, sodium salt (AMPS®) a trademark of the Lubrizol Corporation, vinylphosphonic acid (VPA), and methacrylamidopropyldimethyl-2,3-dihydroxypropyl ammonium sulfate (MAPDMDHPAS) described in U.S. Pat. No. 4,730,081 and U.S. Pat. No. 4,767,550 which are herein incorporated by reference.

The polyamphotlytes are the polymerization product of mixture of monomers containing at least one monomer from each of the following groups:

Group I: acrylamide (AM), partially hydrolyzed acrylamide, N,N-dimethylacrylamide, N-substituted - (N'-dialkylaminoalkyl) acrylamides, aminoalkylacrylates, dialkylaminoalkylacrylates;

Group II: 2-acrylamido-2-methylpropane sulfonic acid, sodium salt (AMPS®), vinylphosphonic acid (VPA), partially hydrolyzed acrylamide; and methacrylamidopropyldimethyl-2,3-dihydroxypropyl ammonium sulfate (MAPDMDHPAS).

Partially hydrolyzed acrylamide may be selected from either Group I or Group II, but not both. The preferred monomers from Group I and Group II are AM and AMPS® respectively.

The preferred formula for the present invention is represented by:

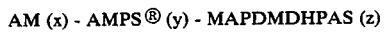

AM (x) - AMPS® (y) - MAPDMDHPAS (z)

where the mole percent of each monomer is represented by x, y and z. Each monomer of the preferred formula is selected to provide a necessary characteristic of the polyampholyte. Group I monomers exhibit some degree of temperature stability and polymerize to high molecular weights (above about 100,000) and thus, provide substantial viscosity in aqueous liquids. The anionic portion of the polyampholyte is selected from the Group II monomers which are relatively salt tolerant. The cationic functionality and the vicinal diol crosslink site of the polyampholyte are supplied by the MAPDMDHPAS monomer. A preferred formula of the polyampholyte has the preferred monomers present where x is at least about 80 mole percent, but less than about 98 mole percent, y is about 10 to 1 mole percent, and z is about 10 to 1 mole percent. The most preferred formula has the preferred monomers present where x is about 93 to 95 mole percent, y is about 2 to 4 mole percent and z is about 3 mole percent. However, small percentages of additional monomers, for example acrylic acid, may be included without adversely affecting the performance of the polyampholyte at high temperatures.

After emulsion polymerization of the monomers, the polyampholyte of the present invention is in the form of a stable invert emulsion. The polyampholyte is solubilized in aqueous liquids upon inversion of the emulsion which is accomplished by adding a surfactant, such as those described in U.S. Pat. Nos. 4,435,528 and 4,552,670, whose teachings are herein incorporated by reference. Generally, any inverting surfactant or inverting surfactant mixture described in the prior art may be used. Preferred inverting surfactants are non-ionic surfactants, such as ethoxylated nonyl phenols containing 10 to 20 moles of ethylene oxide, or alkyl polyethyleneoxy alcohols. The inverting surfactant(s) can be incorporated into the polyampholyte emulsion, thereby forming a self-inverting emulsion, or the inverting surfactant(s) can be added upon dilution of the polyampholyte emulsion with the aqueous liquid.

The inversion rate of the polyampholyte emulsion is rapid, in fact, over about seventy-five percent of the maximum viscosity is obtained in about one minute and over about 90 percent of the maximum viscosity is obtained in about two minutes. This characteristic is particularly useful in continuous-mix fracturing operations whereby the aqueous liquid is viscosified and immediately pumped down the well bore within a few minutes. Viscosity of the polymer solution is primarily dependent upon the polymer concentration. The preferred concentration of the present invention is in the range of about 0.2 percent by weight aqueous liquid to 2.0 percent by weight aqueous liquid. The most preferred polymer concentration is in the range of about 0.5 percent to 0.8 percent by weight aqueous liquid.

The polymer solution may be buffered to the appropriate pH by either incorporating a pH modifying substance into the polyampholyte emulsion or adding a pH modifying substance upon dilution with the aqueous liquid. The pH is adjusted to the range of about 4 to 6.5 using typical pH modifying substances, such as hydrochloric acid; admixtures of ammonium acetate and acetic acid; potassium biphthalate; admixtures of formic acid and sodium bicarbonate; or any other buffer that does not adversely react with the other constituents by preventing or substantially inhibiting gel formation. The stability of the crosslinked polyampholyte at elevated temperatures depends upon maintaining the initial pH in this range. As the initial fluid pH increases above 7, the gel performance becomes less. Potassium biphthalate (KHP) is the preferred pH adjusting additive because it consistently provides an initial fluid pH of about 5 to 6.

Once the polyampholyte is solubilized in the aqueous liquid at the appropriate pH, a crosslinking agent is added to provide a metal ion that ultimately forms a bridge between the vicinal diol groups of the polymer. After this crosslinking reaction occurs, a viscoelastic, high temperature-stable gel is formed. The crosslinking agent is added in an amount to provide a metal ion concentration in the range of from about 0.004 percent by weight to 0.1 percent by weight of polymer solution. Crosslinking agents utilized in the present invention can generally be described as water soluble salts and complexes of multi-valent metal cations. Examples of multi-valent metal ions are zirconium, antimony, titanium, and chromium. In addition to the metal cations, boron and the like can be utilized as a crosslinking agent. Preferred crosslinking agents of the present invention are titanium (IV) and zirconium (IV) salts which provide a metal ion concentration in the range of about 0.03 to 0.06. The most preferred crosslinking agents are zirconium complexes, such as zirconium lactate, zirconium lactate/malate admixtures and zirconium dimalate; the most preferred being zirconium lactate/malate admixtures.

The crosslink reaction rate between the polyampholyte and the metal ion depends upon pH and the particular salt or complex associated with the metal ion. The polyampholyte of the present invention crosslinks rapidly (in less than about one minute) with titanium triethanolamine and zirconium acetate. However, retarded titanium and zirconium crosslinking compositions are preferred, such as those described in U.S. Pat. Nos. 4,477,360, 4,464,270, 4,502,967, 4,470,915, and 4,462,917. U.S. Pat. Nos. 4,477,360, 4,464,270, 4,502,967, 4,470,915, and 4,462,917 are incorporated herein by reference for all purposes. Zirconium lactate and zirconium malate complexes are preferred in the present invention because heating to a temperature above ambient is required to initiate the crosslinking reaction and viscosity development. This delayed crosslinking mechanism minimizes mechanical degradation of the gel as it flows through the surface tubing and down the well bore and results in higher viscosity once the gel reaches the formation. In addition, the low viscosity fluid produced as a result of delayed crosslinking reduces the friction pressure generated during pumping, which in turn reduces the horsepower required to inject the fluid.

The high viscosity, high temperature-stable gels formed in accordance with the present invention are particularly suitable for stimulating subterranean formations in the temperature range of 250° F. to 400° F. The preferred temperature range of this invention is about 300° F. to 400° F., with the most preferred being about 350° F. to 400° F. While temperature stability of the crosslinked polyampholyte in aqueous liquid is excellent without additives, the stability can be further enhanced by the addition of stabilizers, such as antioxidants and oxygen scavengers.

To further illustrate the present invention and facilitate a clear understanding thereof, the following examples are given:

EXAMPLE 1

To illustrate the salt tolerance of the polyampholytes of the present invention, polymer compositions were evaluated in various brines. The polyampholyte emulsions were inverted in the aqueous liquids using a non-ionic surfactant to form polymer solutions of about 1 wt %. Larger or smaller quantities of polymer can be utilized depending upon the viscosity required for a particular application. The polymer solutions were mixed on a Waring® Blendor for 30 seconds, and the viscosities were measured after 60 minutes at ambient temperature using a Fann Model 35® viscometer equipped with a standard bob and sleeve geometry. The apparent viscosity values set forth in Table 1 show the ability of these polyamphotytes to viscosify in the presence of mono- and di-valent cations.

TABLE 1

| Polymer Composition Mole % | Apparent Viscosity cps at 511 s$^{-1}$ (1) | | |
| --- | --- | --- | --- |
| AM — AMPS® — MAPDHPAS | Deionized H$_2$O | 2% KCL | API Brine$^{(2)}$ |
| 100 — 0 — 0 (3) | 48 | 53 | 62 |
| 93 — 4 — 3 | 65 | 57 | 69 |
| 98 — 1 — 1 | 73 | 78 | 92 |
| 80 — 10 — 10 | 12 | 45 | 47 |

$^1$Reciprocal seconds (s$^{-1}$), International System of Units
$^2$API Brine Contains 10% NaCl and 1.5% CaCl$_2$.2H$_2$O
$^3$Polymer Concentration 0.72 wt %

EXAMPLE 2

The ratio of the preferred monomers is important to provide a thermally stable, crosslinkable polyampholyte as shown in Table 2. Various polyampholyte compositions were crosslinked with zirconium lactate and evaluated on a Fann Model 50® viscometer. The viscometer is fitted with a modified bob that provides a shear rate range of 0 to 180 s$^{-1}$. After the gel sample is placed on the viscometer, stress measurements are made at ambient temperature, and then the gel is heated by raising the preheated oil bath (350° F.). Stress measurements are taken over the shear rate range of 0 to 180 s$^{-1}$ every 15 minutes and power law parameters, n' and k, are then used to calculate apparent viscosity. The shear rate between scans is constant at 120 s$^{-1}$. Many times the viscosity of the gels is so high as to induce slippage of the fluid at the bob surface, thus affecting the stress measurements. As a result, many tests were conducted and the average viscosity is recorded.

TABLE 2

Test Temperature: 350° F.

| Polymer Composition AM — AMPS® — MAPDMDHPAS | Average Viscosity After 120 Minutes @ 350° F. Centipoise (cps) at 170s$^{-1}$ |
| --- | --- |
| 100 — 0 — 0 | 30 |
| 98 — 1 — 1 | 60 |
| 97 — 0 — 3 | 60 |
| 93 — 4 — 3 | 450 |
| 80 — 10 — 10 | 260 |

No buffers added
0.72 wt % Polyampholyte
2% Potassium Chloride
0.24 wt % stablizer
0.0175 wt% Zirconium Ion The cationic diol monomer, MAPDMDHPAS, provides the crosslinkable group along the polymer backbone and must be present in an amount of at least 1 to 10 mole percent to increase viscosity at 350° F. Gel viscosity development is also greater when the anionic and cationic functionalities are present in about the same mole percentages.

EXAMPLE 3

To illustrate the importance of pH in obtaining the high temperature-stable gels of the present invention, the following tests were performed. The preferred polyampholyte composition (AM(93) - AMPS®(4)-MAPDMDHPAS(3)) was prepared in 2% KCL tap water at a polymer concentration of 0.72 wt %. As listed in Table 3, buffers were added to the polymer solution at various concentrations to adjust the initial pH. The polymer solutions were admixed with 0.6 volume % zirconium lactate/malate crosslinking agent (1:1:1 mole ratio) and the viscosity was measured on a Fann Model 50® viscometer as described in Example 2.

TABLE 3

Polymer: 0.72 wt %
Stablizer: 0.24 wt %
Crosslinker: 0.6 Volume %
2% KCl Tap Water
Test Temperature: 350° F.

| Test No. | pH Additive | Concentration | Initial pH | Viscosity cps at 170s$^{-1}$ After 60 Minutes |
| --- | --- | --- | --- | --- |
| 1 | Ammonium Hydroxide | — | 8.14 | <40 |
| 2 | Potassium Hydroxide(1N) | 2 gpt$^{(1)}$ | 7.29 | 180 |
| 3 | Ammonium Acetate Ammonium Acetate Acetic Acid Admixture$^{(3)}$ | 5 lb/Mgal$^{(2)}$ .5 gpt | 6.19 | 650 |
| 4 | Hydrochloric Acid (1N) | 1 gpt | 6.32 | 620 |
| 5 | Potassium Bipthlate | 15 lb/Mgal | 4.78 | 960 |

$^{(1)}$gpt = gallons per thousand gallons of aqueous liquid
$^{(2)}$lb/Mgal = pounds per thousand gallons of aqueous liquid
$^{(3)}$2 parts Ammonium Acetate to 1 part Acetic Acid The data in Table 3 demonstrate that the viscosity development of the crosslinked polyampholyte greatly increases as the pH approaches 4. Gels with high initial pH's (greater than pH 7) develop some viscosity. However, when the initial pH is decreased to less than 7, the magnitude of the viscosity increases in excess of a factor of 3.

EXAMPLE 4

To illustrate the remarkable temperature stability of the stimulation fluid of the present invention, the following tests were performed. Gel compositions were prepared of the preferred polyampholyte (93-4-3) at 0.72 wt % in 2% potassium chloride (containing 0.24 wt % stablizer and 0.06 wt % KHP) and the crosslinking agents listed in Table 4. The gels were evaluated on a Fann Model 50® viscometer as described in Example 2.

TABLE 4

| Crosslinking Agent at 0.052% Zirconium by wt | Temp. (°F.) | Average Apparent Viscosity, cps at $170s^{-1}$ | | |
|---|---|---|---|---|
| | | Initial[1] | 75 min[2] | 135 min |
| Zirconium Lactate/ Malate (1:1:1 molar ratio) | 350 | 56 | 623 | 430 |
| | 400 | 50 | 500 | 250 |
| Zirconium Dimalate (1:2 molar ratio) | 400 | 50 | 480 | 200 |

[1] Initial viscosity measured at ambient temperature.
[2] Gel sample reached final test temperature in 15 to 20 minutes.

The data in Table 4 demonstrate the delayed crosslinking mechanism of the preferred invention. The apparent viscosity of the gel prior to heating is about 50 cps which is nearly the viscosity of the polymer solution before crosslinking (about 30 cps). In addition, the data show that the preferred stimulation fluid of the present invention produces substantial viscosity at 400° F. for time periods in excess of two hours.

Generalized Method of Fracturing

Hydraulic fracturing of a subterranean formation is accomplished by introducing the fluid of the present invention into the selected formation through a wellbore. The fluid of the present invention is prepared by diluting the polyampholyte emulsion in an aqueous liquid and inverting the emulsion to form a polymer solution at the appropriate pH. The polymer solution is admixed with a crosslinking agent, or other additives such as a particulate agent, as it is pumped in the wellbore. As the fluid travels down the wellbore, the temperature increases and accelerates the crosslinking reaction so that the viscosity of the polyampholyte gel increases. Injection of the fluid into the wellbore must be of sufficient rate and pressure to produce a fracture in the formation that extends from the wellbore.

We claim:

1. A method of fracturing a subterranean formation comprising:
    providing a polyampholyte that is the polymerization product of a mixture of monomers, comprising at least one from each of the following groups:
        Group I: acrylamide (AM), partially hydrolyzed acrylamide, N,N-dimethylacrylamide, N-substituted - (N'-dialkylaminoalkyl) acrylamides, aminoalkylacrylates, dialkylaminoalkylacrylates or mixtures thereof;
        Group II: 2-acrylamido-2-methylpropane sulfonic acid, sodium salt (AMPS®), vinylphosphonic acid (VPA), partially hydrolyzed acrylamide or mixtures thereof; and
        methacrylamidopropyldimethyl-2,3-dihydroxypropyl ammonium sulfate (MAPDMDHPAS);
    provided that partially hydrolyzed acrylamide may be selected from Group I or Group II, but not both;
    inverting said polyampholyte to form a viscous aqueous liquid;
    buffering said aqueous liquid with pH modifying substances in an amount sufficient to adjust the pH in the range of about 4 to 6.5;
    admixing said polyampholyte in aqueous liquid with an agent capable of forming a crosslink with the dihydroxypropyl functionalities of said polyampholyte to subsequently form an aqueous gel; and
    injecting said fluid in a mixture with or without a particulate agent into said formation at a rate and pressure sufficient to fracture said formation.

2. The method of claim 1 wherein said polyampholyte comprises the polymerization product of a mixture of monomers comprising AM from Group I, AMPS® from Group II and MAPDMDHPAS, containing AM in the amount of at least 80 mole percent but less than 98 mole percent, AMPS® in the amount of 10 mole percent to 1 mole percent and MAPDMDHPAS in the amount of 10 mole percent to 1 mole percent.

3. The method of claim 1 wherein said polyampholyte is present in an amount in the range of about 0.2 percent by weight to about 2.0 percent by weight aqueous liquid.

4. The method of claim 1 wherein said crosslinking agent comprises a compound selected from the group providing zirconium (IV) or titanium (IV) ions in an amount in the range of about 0.004 to 0.1 percent by weight.

5. The method of claim 1 wherein said pH modifying substances are incorporated in the polyampholyte emulsion or added upon dilution of the polyampholyte emulsion in the aqueous liquid.

6. A method of fracturing a subterranean formation comprising:
    providing a polyampholyte that is the polymerization product of a mixture of monomers comprising at least one from each of the following groups:
        Group I: acrylamide (AM), partially hydrolyzed acrylamide, N,N-dimethylacrylamide, N-substituted - (N'-dialkylaminoalkyl) acrylamides, aminoalkylacrylates, dialkylaminoalkylacrylates or mixtures thereof;
        Group II: 2-acrylamido-2-methylpropane sulfonic acid, sodium salt (AMPS®), vinylphosphonic acid (VPA), partially hydrolyzed acrylamide or mixtures thereof; and
        methacrylamidopropyldimethyl-2,3-dihydroxypropyl ammonium sulfate (MAPDMDHPAS);
    provided that partially hydrolyzed acrylamide may be selected from Group I or Group II, but not both;
    wherein said Group I monomer is present in the amount of at least 80 mole percent, but less than 98 mole percent;
    wherein said Group II monomer is present in the amount of at least 10 mole percent to 1 mole percent; and
    wherein said MAPDMDHPAS is present in the amount of at least 10 mole percent to 1 mole percent;
    inverting said polympholyte using a surfactant to form a viscous aqueous liquid;

buffering said aqueous liquid with pH modifying substances in an amount sufficient to adjust the pH to the range of about 4 to 6.5;

admixing said polyampholyte in aqueous liquid with a crosslinking agent selected from compounds which will provide titanium (IV) or zirconium (IV) ions to subsequently form an aqueous gel; and injecting said fluid in a mixture with or without a particulate agent into said formation at a rate and pressure sufficient to fracture said formation.

7. The method of claim 6 wherein said Group I monomer is AM and said Group II monomer is AMPS®.

8. The method of claim 6 wherein said polyampholyte is present in an amount in the range of about 0.2 percent by weight to 2.0 percent by weight aqueous liquid.

9. The method of claim 6 wherein said crosslinking agent is selected from the group comprising zirconium lactate, zirconium lactate/malate, and zirconium dimalate to provide zirconium (IV) ions in the amount of about 0.004 to 0.1 percent by weight.

10. The method of claim 6 wherein said pH modifying substances are incorporated in the polyampholyte emulsion or added upon dilution of the emulsion in the aqueous liquid.

11. The method of claim 10 wherein said pH modifying substances are selected from the group comprising acetic acid, ammonium acetate, potassium biphthalate, formic acid, sodium bicarbonate and mixtures thereof.

12. A method of fracturing a subterranean formation comprising:

providing a polyampholyte that is the polymerization product of a mixture of monomers comprising at least one from each of the following groups:

Group I: acrylamide (AM), partially hydrolyzed acrylamide, N,N-dimethylacrylamide, N-substituted - (N'-dialkylaminoalkyl) acrylamides, aminoalkylacrylates, dialkylaminoalkylacrylates or mixtures thereof;

Group II: 2-acrylamido-2-methylpropane sulfonic acid, sodium salt (AMPS®), vinylphosphonic acid (VPA), partially hydrolyzed acrylamide or mixtures thereof; and methacrylamidopropyldimethyl-2,3-dihydroxypropyl ammonium sulfate (MAPDMDHPAS);

provided that partially hydrolyzed acrylamide may be selected from Group I or Group II, but not both;

wherein said Group I monomer is present in the amount of at least 80 mole percent, but less than 98 mole percent;

wherein said Group II monomer is present in the amount of at least 10 mole percent to 1 mole percent; and wherein said MAPDMDHPAS is present in the amount of at least 10 mole percent to 1 mole percent;

inverting said polympholyte using a surfactant to form a viscous aqueous liquid;

buffering said aqueous liquid with pH modifying substances selected from the group comprising admixtures of ammonium acetate and acetic acid; potassium bithalate; admixtures of formic acid and sodium bicarbonate in an amount sufficient to adjust the pH to range of about 4 to 6.5;

admixing said polyampholyte in aqueous liquid with a crosslinking agent selected from the group comprising zirconium lactate, zirconium lactate/malate, and zirconium dimalate; and injecting said fluid in a mixture with or without a particulate agent into said formation at a rate and pressure sufficient to fracture said formation.

13. The method of claim 12 wherein said Group I monomer is AM and said Group II monomer is AMPS®.

14. The method of claim 12 wherein said polyampholyte is present in an amount in the range of 0.2 percent by weight to 2.0 percent by weight aqueous liquid.

15. The method of claim 12 wherein said crosslinking agent provides zirconium (IV) ions in the range of about 0.004 to 0.1 percent by weight 16. The method of claim 12 wherein said pH modifying substances are incorporated in the polyampholyte emulsion or added upon dilution of the emulsion in the aqueous liquid.

* * * * *